Patented Aug. 18, 1931

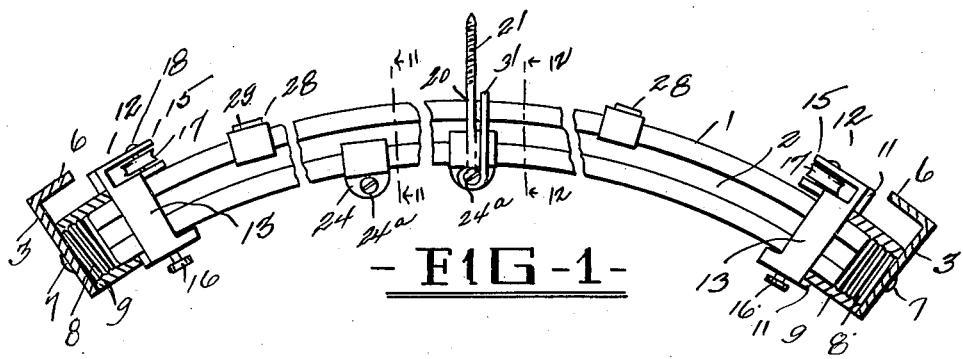
FIG-1-
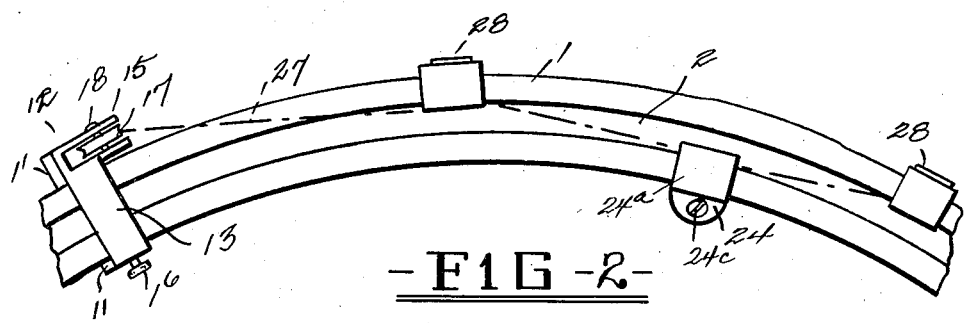
FIG-2-
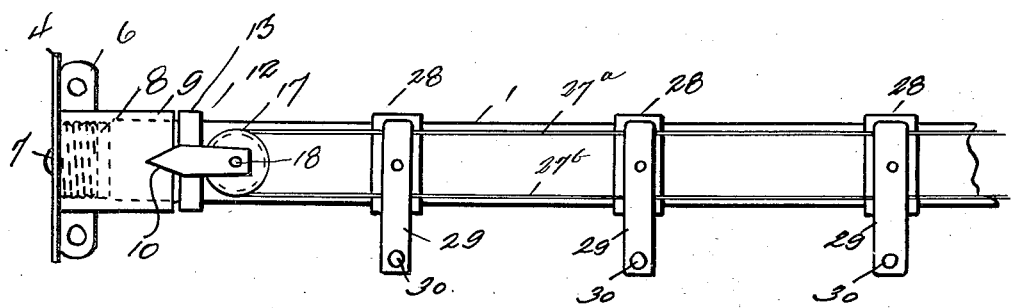
FIG-3-
Inventors
CHARLES S. NUDELMAN AND
HARRY KRUGLICK,
Attorney Aug. 18, 1931.  C. S. NUDELMAN ET AL  1,819,379
HANGER FOR DRAPERIES
Filed March 29, 1930   3 Sheets-Sheet 2
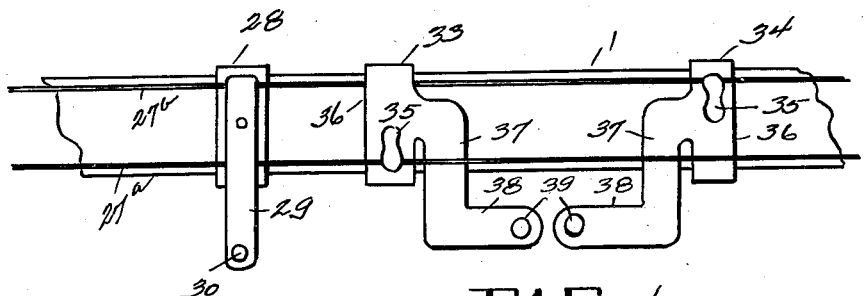
FIG-4-
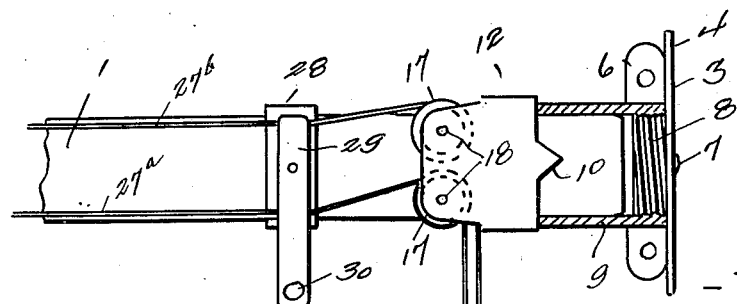
FIG-5-
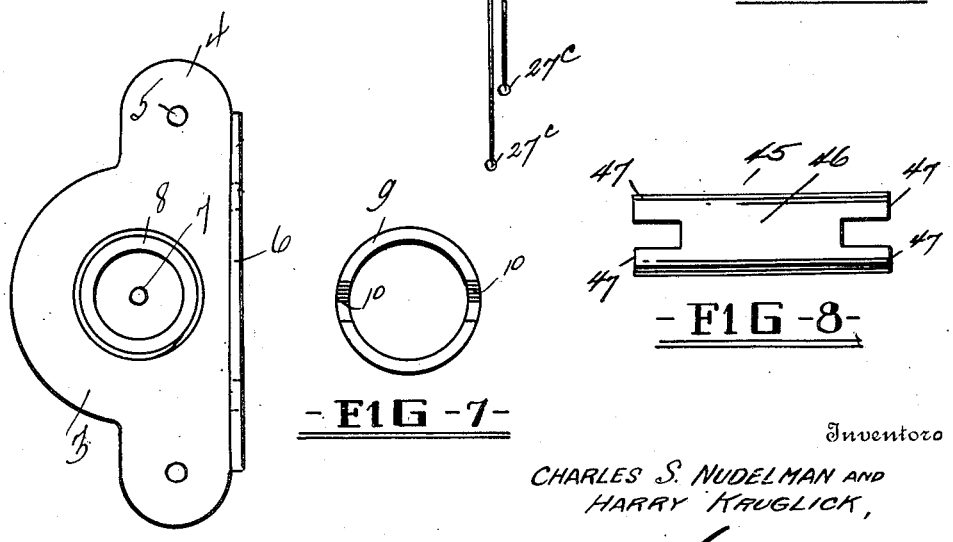
FIG-6-   FIG-7-   FIG-8-
Inventors
CHARLES S. NUDELMAN AND
HARRY KRUGLICK,
By
Attorney

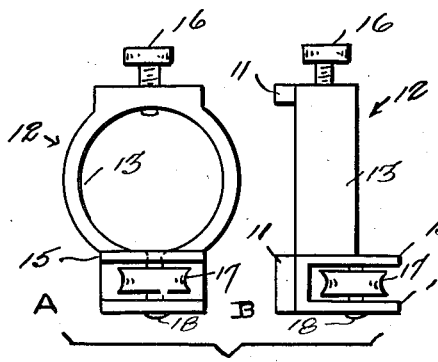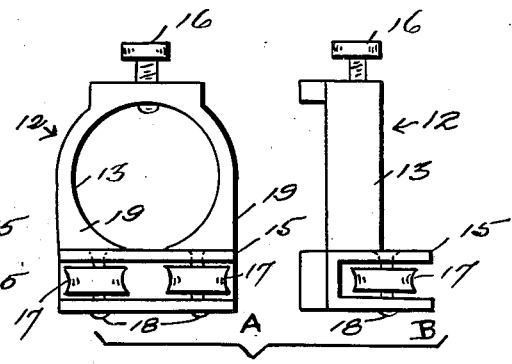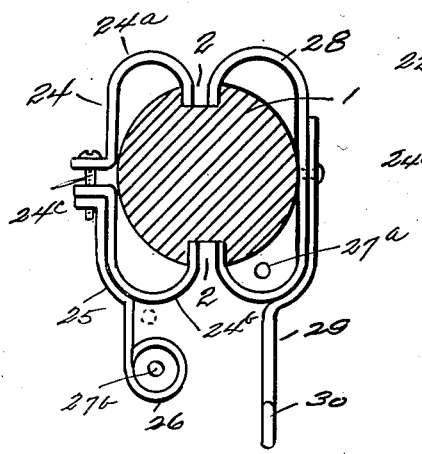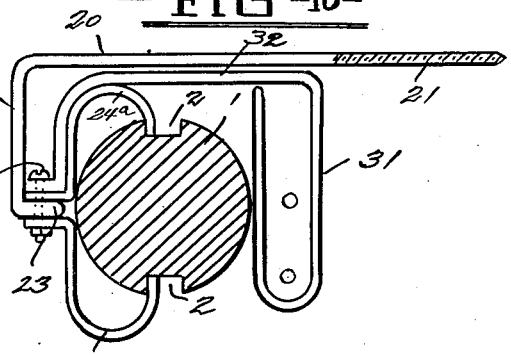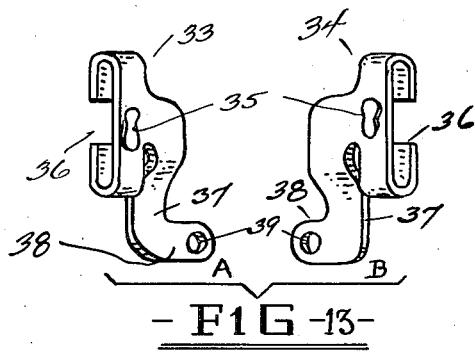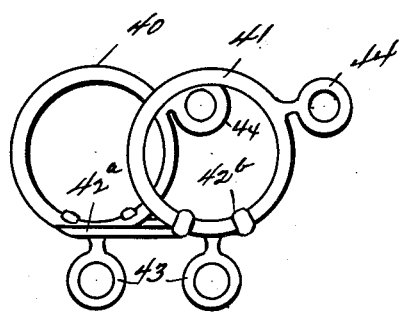

1,819,379

UNITED STATES PATENT OFFICE

CHARLES S. NUDELMAN AND HARRY KRUGLICK, OF CHICAGO, ILLINOIS

HANGER FOR DRAPERIES

Application filed March 29, 1930. Serial No. 440,019.

Our present invention, in its broad aspect, has to do with improvements in hangers for draperies, of the type known as draw cord traverse track hangers for curtains, and other types of draperies, and the track may be either straight or curved, and adapted for any kind of door, window or other opening. Furthermore the details such as the clamps, traveling half-rings, masters, brackets and the like are greatly improved and rendered simpler and more effective, and the traversing cords for the curtains cannot bind or become too loose, and are concealed so that the appearance of the curtains or other draperies is not affected.

Devices with which we are familiar and which are of the type of the present invention, have, heretofore required specially shaped tracks, enclosed, and if such a track becomes slightly notched or mis-shapen it is usually necessary to return it to the factory for repairs. Where curved rods are used it is necessary that they be bent at the factory and cut to fixed lengths. Our invention on the other hand is much simpler and cannot get out of order, and neither can the traversing-half-rings bind on the track, or the track become loose; all the moving parts on the track can pass each other, and where desired the curtains or draperies can be overlapped so that a false effect can be had of an opening in the curtains at a certain point whereas as a matter of fact the curtains can be made to move as a unit, this is especially desirable in the case of a series of inswinging windows. In addition to the above, the traversing track of our invention can be set up, taken down, or adjusted without employing a skilled mechanic. The pulley elements are so constructed that they serve also as retaining and locking means for the traversing track, and the traversing cords are so supported that they are invisible, out of the way, and cannot sag down or bind. The supports, traveling half-rings, clamps and the like, including the masters are simple in construction and are made cheaply and efficiently out of bent metal so that the entire cost of our invention, retail, is well within the purse of any purchaser of such devices.

The structural elements employed to accomplish the above and other results and objects which will hereinafter appear and be more fully described in detail may possibly undergo slight changes without departing from the spirit of the invention, and to that end, interpretation of the invention should only be conclusive when made in the light of the subjoined claims.

In the accompanying drawings wherein is illustrated a preferred embodiment and several modifications of our invention:—

Figure 1 is a top plan view (broken away and contracted) of the curved form of our invention, and shows in detail the end brackets therefor, Figure 2 is another top plan view of the type shown in Figure 1 and shows the manner of ordinarily spacing the traveling half-rings, and clamps, Figure 3 is a front elevation of a part of a straight type of our invention, Figure 4 is a view of a part of our invention showing the master members, Figure 5 is a view showing the double pulleys or rollers for the cord, Figure 6 is a plan view of the supporting bracket for our device, Figure 7 is a view of the socket member for the supporting bracket, Figure 8 is a view of the curved tie used with the double ring shown in Figure 14, Figure 9, views A and B show the single pulley end fitting for the rod, Figure 10, views A and B show the double pulley end fitting for the rod, Figure 11 is a view taken on the line 11—11 of Figure 1, Figure 12 is a view taken on the line 12—12 of Figure 1, Figure 13, views A and B show the right and left masters, and Figure 14 is a detail view of the double ring.

In the drawings wherein like characters of reference are used to designate like or similar parts throughout the several views:—

The numeral (1) designates a rod member which is circular in cross-section, and may be either curved or straight as shown in Figures 1 and 3 respectively. The rod is provided with opposite continuous channels (2), which are so disposed in practice that they are vertically aligned. The rod constitutes the traversing track for the curtain or other drapery.

In order to fix the rod above a window, door or the like, we provide end brackets (3), which have ears (4) formed with openings (5) therein, and a right-angular extension (6) formed with openings therein; these to receive suitable attaching means. On the bracket (3) is fixed by means of a rivet (7) a screw threaded nipple (8) carrying an annular socket member (9). The ends of the rod (1) are carried and retained in the sockets (9). In order to hold the rod firmly in place without rotating, each socket is provided with spaced opposed angular notches (10) in which fit the teeth (11) of the combination locking and pulley carrying parts (12); these have an annular ring portion (13) through which the rod is threaded, and parallel extensions (15) on one end, and a thumb clamp-screw (16) on the other end. In practice the rod is fitted into the sockets (9) and these are screwed upon the brackets (3) on the frames to either side of a window, door, or the like; the parts (12) are then moved up to engage the teeth (11) in notches (10) and the clamp-screws (16) tightened up. This brings the parallel extensions closely in line with the surface of the rod.

As shown in Figures 9 and 10, the parts (12) are designed to carry either a single pulley—as in Figure 9—or a double pulley—as in Figure 10—and these will hereinafter be termed "single pulley carriers" and "double pulley carriers." The pulleys (17) are carried between the spaced, parallel extensions (15) and supported rotatably on pins (18). By reference to Figures 9 and 10 it will be noted that the extensions (15) are tangential to the center opening of the annular ring portion (13), and that the double pulley type shown in Figure 10 is squared off as at (19) so that the extensions are considerably broader than in the single pulley type so that both pulleys may be accomodated one above the other in spaced relationship. The single and double pulleys face each other from their positions at the respective ends of the rod.

Referring now to Figure 1, wherein the curved type of rod is illustrated, it will be noted that means are provided for supporting it at the center as from a wall. This center support comprises a shank (20) threaded as at (21) to be screwed into a wall, and a downwardly bent portion (22) terminating in an inwardly bent eye (23).

Disposed at intervals along the rod are a series of clamps (24) each formed with similar upper and lower sections (24a) and (24b) connected by a screw (24c). The eye (23) of the center support is caught on the screw (24c) and clamped in place as shown in Figure 12. Each clamp has a depending part (25) bent to form an eye (26) through which the traversing cord—one length thereof—designated (27) is trained to support the same. The cord is so arranged that it is trained over the single pulley with the upper and lower lengths (27a) and (27b) extending short of the top and bottom edges of the rod to be out of sight and the ends—respectively—passing over the respective double pulleys as shown in Figure 5. The ends are weighted as at (27c) to normally hold the cord tight.

Slidably mounted on the rod are traveling half-rings (28), each of which has a depending part (29) formed with an eye (30) to which a curtain or drape is adapted to be attached by suitable cords, pins or the like (not shown). Both the clamps and the half-rings engage in the respective upper and lower channels (2) of the rod as shown in the drawings, and the channels are formed so that the traveling half-rings pass the clamps without touching or binding. In practice it is desirable for one length (27a) of the cord (27) to pass through the traveling half-rings as in Figure 11, and the other length (27b) in the eyes of clamps (24); both the clamps and half-rings are used with the curved type of my rod as shown in Figure 1, and the manner of training the cord is shown in dot-and-dash-lines in Figure 2; however in the straight type of rod shown in Figure 3, the clamps (24) may be omitted, and the lengths (27a) and (27b) of the traversing cord (27) passed through the upper and lower lobes of the half-rings as shown in Figure 3, and in Figures 4 and 5. When the curved rod is used with the center support the lengths of cord pass through the elongated eye (31) formed on the fitting (32) which is attached to the clamp by screw (24c) and extending above and behind the rod as shown so as to be invisible, out of the way, and not bind or become entangled.

There are two masters (33) and (34), shown in Figure 13, views A and B. It is to these that the respective lengths of the cord (27) are attached by members (35); each master includes a half-ring part (36) and a depending part (37) formed with an angular extension (38) having an opening therein (39) for attaching the curtain or drape. The extensions are in opposite directions as shown, so that when the curtains are drawn together by manipulating the traversing cord (27) they overlay or overlap each other.

Where it is desired to attain a false impression of double curtains as in the case of inwardly hinged windows, a double ring is used. The double ring is shown in Figure 14 and the respective rings (40) and (41) are connected by lengths of wire (42a) and (42b); each ring has a depending eye (43) to which the curtain or drape is adapted to be attached, and upper, laterally extending eyes (44) for receiving the traversing cord. In place of the lengths of wire (42a) and (42b) a single sheet metal fitting (45) may be substituted and is preferable; this fitting includes a curved body portion—semicircular—designated (46) and spaced, parallel end extensions (47) which are adapted to be turned about the respective rings (40) and (41) to hold them together.

In practice, either a straight or curved rod (1) may be used, but if a curved rod is used it is desirable that clamps (24) be also used to take up any slack or the like in the cord (27). While it is believed that the operation of my device is apparent from the foregoing it is pointed out that it is merely necessary to screw the sockets (9) on the nipples (8) of brackets (3); attach the brackets to the frame of the opening with the ends of the rod (1) inserted, and then place the teeth (11) of members (12) in engagement with notches (10) of the sockets, whereupon the thumb screws are tightened up to complete the assembly. If necessary the rod (especially the curved type) can be additionally supported by attaching the member (20) to an intermediate base by means of the screwthreaded end (22). The curtain is then attached and hung on traveling half-rings (28) and the cord (27) passed over the upper pulley of the double pulley fitting, around the single pulley at the opposite end of the rod, and then over the under pulley of the double pulley; the two lengths (27a) and (27b) thus formed being attached to the clasps (35) of the masters (33) and (34) respectively. The cord lengths (27a) and (27b) are prevented from sagging by running them through the clamps (24) and the lobes of traveling half-rings (28) as indicated in the drawings, and thus any sagging is prevented; the cord is held relatively tight; and it cannot be seen and is out of the way. It will be noted that the cord is so arranged that it is wholly back of the rod. The weighted ends (27c) tend to take up slack in the cord. The curtains are manipulated by pulling the ends of the cord in the usual manner, and there is no possibility of binding since the channel (2) permits passage of the elements by each other. Especial attention is called to the ease with which the rod may be set up and mounted by means of the brackets; sockets, and fittings (12). The device can be readily set up without the employment of skilled labor and is cheaply and easily manufactured at relatively small cost, and will not become out of order or notched or bent so that return to the factory is necessary.

While there has been described in the foregoing and illustrated in the drawings particular forms of my invention, it is to be understood that such changes may be made as fall within the spirit of the invention, and the scope of the appended claims.

We claim:—

1. In a support for draperies of the type, having a rod on which the draperies are mounted, a bracket at each end of the rod, each bracket having a socket member for receiving the end of the rod, and a supporting part for attachment to a brace, a combined pulley mounting and clamping device carried on each end of the rod and formed with a ring-like body portion on which the pulleys are positioned, means for clamping the ring-like body on the rod, and means provided on said ring-like body for locking engagement with the socket member of the bracket so that the rod will be rigidly supported in the bracket when the ring-like body is clamped on the rod.

2. In a support for draperies of the type having a rod on which the draperies are mounted, a bracket for supporting the rod and a combined pulley mounting and clamp, means forming a locking engagement between the bracket and the combined pulley mounting and clamp, and said clamp being operable to lock the rod against rotation therein so that the rod, pulley mounting, and clamp, and bracket form a rigid organization.

3. In a support for draperies of the type having an arcuate solid rod on which the draperies are hung, a combined supporting bracket and socket for receiving the end of the rod, said socket formed with a notch, and a combined pulley mounting and clamp, said combined pulley mounting and clamp formed with a toothed extension engaging in the notch to lock the combined pulley mounting and clamp against independent rotation with respect to the bracket, and said clamp being operable to lock the rod therein against rotation so that the rod, pulley mounting and clamp, and bracket form a rigid organization.

4. In a support for draperies of the type having a rod on which the draperies are mounted, a bracket at each end of the rod, each bracket having a socket member for receiving the end of the rod, and a supporting part for attachment to a brace, the periphery of the socket member having a notch therein, a combined pulley mounting and clamping device carried on each end of the rod and formed with a ring-like body portion on which the pulleys are positioned, a tooth on the body portion, means for clamping the ring-like body on the rod, and the tooth provided on said ring-like body designed for locking engagement with the notch in the socket member of the bracket so that the rod will be rigidly supported in the bracket when the ring-like body is clamped on the rod.

5. In a support for draperies of the type having a rod on which the draperies are mounted, a bracket for supporting the rod and a combined pulley mounting and clamp, interfitting, quickly detachable means forming a locking engagement between the bracket and the combined pulley mounting and clamp to prevent relative independent rotation thereof, and said clamp being operable to lock the rod against rotation therein so that the rod, pulley mounting and clamp, and bracket form a rigid organization.

6. In a support for draperies of the type having an arcuate solid rod on which the draperies are hung, a combined supporting bracket and socket for receiving the end of the rod, said socket formed with a peripheral notch, and a combined pulley mounting and clamp, said combined pulley mounting and clamp formed with an annular ring-like body having a toothed extension engaging in the notch to lock the combined pulley mounting and clamp against independent rotation with respect to the bracket when the ring-like body is forced against the bracket, and said clamp being operable to lock the rod therein against rotation so that the rod, pulley mounting and clamp, and bracket form a rigid organization.

In testimony whereof, we affix our signatures hereunto,

CHARLES S. NUDELMAN.
HARRY KRUGLICK.